United States Patent [19]

Persson

[11] 4,088,796
[45] May 9, 1978

[54] METHOD FOR MAKING ANIMAL FEED FROM MANURE

[75] Inventor: Per Oskar Persson, Helsingborg, Sweden

[73] Assignee: Ingenjörsfirman Per Oskar Persson AB, Helsingborg, Sweden

[21] Appl. No.: 687,967

[22] Filed: May 19, 1976

Related U.S. Application Data

[63] Continuation of Ser. No. 540,064, Jan. 10, 1975, abandoned, which is a continuation of Ser. No. 352,390, Apr. 18, 1973, abandoned.

[30] Foreign Application Priority Data

Apr. 19, 1972 Sweden .................................. 725068

[51] Int. Cl.² .............................................. A23K 1/00
[52] U.S. Cl. .................................... 426/641; 426/388; 426/465; 426/807
[58] Field of Search ............... 426/807, 465, 473, 531, 426/635, 521, 512, 388, 641; 71/21, 22

[56] References Cited

U.S. PATENT DOCUMENTS 3,214,844  11/1965  Oates et al. ............................ 34/10
3,293,768  12/1966  Blank et al. ............................ 34/10

FOREIGN PATENT DOCUMENTS 1,942,268  3/1971  Germany ................................ 71/21
6,905,045  4/1969  Netherlands ........................... 21/21

Primary Examiner—Hiram H. Bernstein
Attorney, Agent, or Firm—Beveridge, DeGrandi, Kline & Lunsford

[57] ABSTRACT

In making dried animal feed from substantially semi-fluid non-mouldable manure from poultry and other domestic animals the non-mouldable manure is converted into a mouldable product by mixing it with already dried manure and then moulding the product into particles of substantially equal size, which are dried by imparting to the particle a fluidizing movement by means of a flowing hot gas in a so-called fluidized bed.

A plant for making dried animal feed from substantially semi-fluid non-mouldable manure from poultry and other domestic animals comprises a mixer with inlets for both the non-mouldable manure and already dried manure, a unit disposed after the mixer for moulding the mixed product into particles, and a container with a perforated bottom in which a fluidizing movement is imparted to the particles in a so-called fluidized bed. The container having the perforated bottom is divided into at least two processing sections following upon each other in the direction of feed of the particles for processing them with separate gases.

9 Claims, 2 Drawing Figures

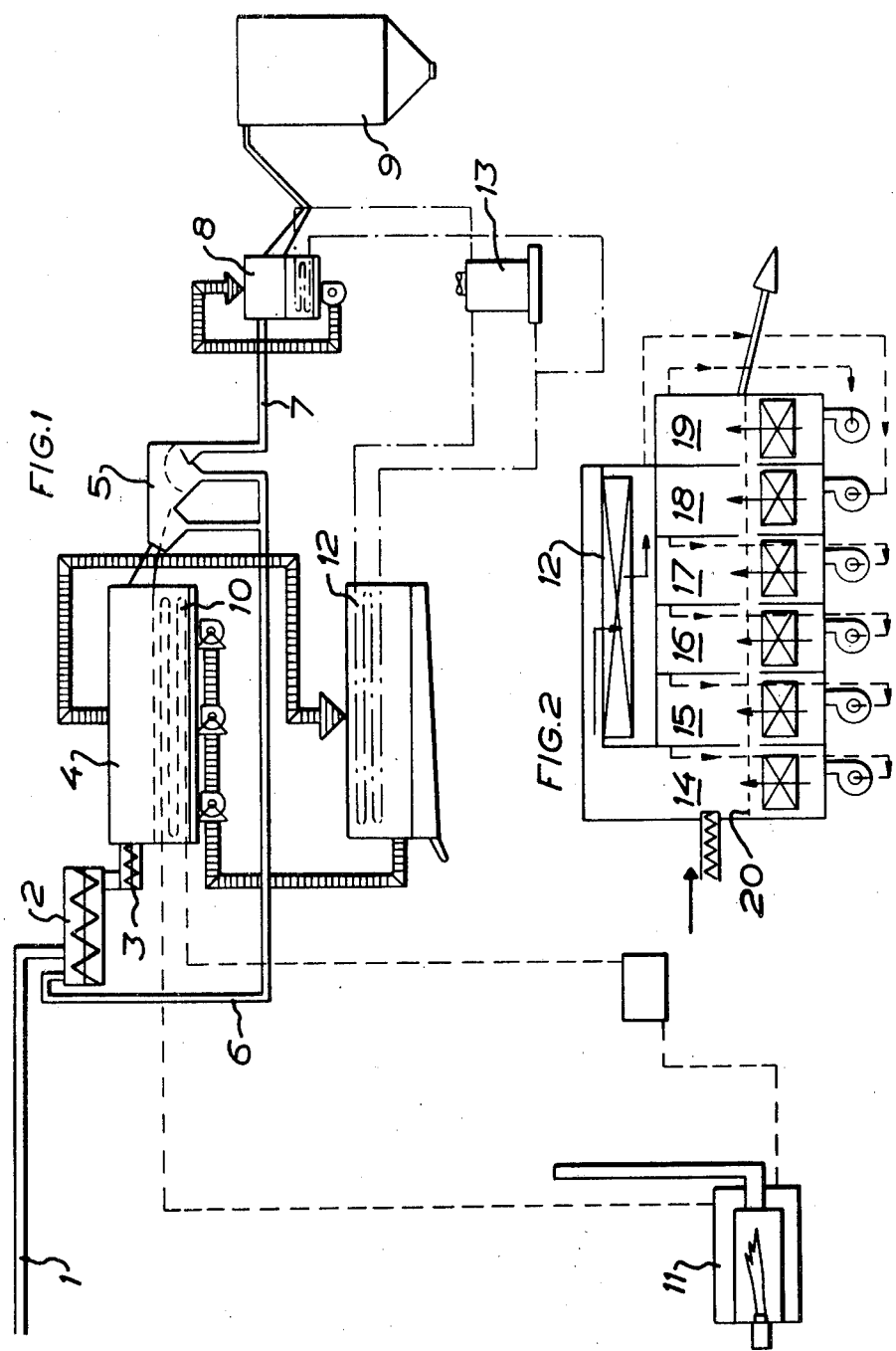

METHOD FOR MAKING ANIMAL FEED FROM MANURE

This is a continuation of application Ser. No. 540,064, filed Jan. 10, 1975, which is a continuation of application Ser. No. 352,390, filed Apr. 18, 1973, both abandoned.

This invention relates to a method of making animal feed from substantially semi-fluid manure from poultry and other domestic animals, in which the manure is dried and formed into particles. Although many different methods have been applied already they could not satisfy all the demands placed on them. Thus, drying was effected under such conditions that the constituents of the feed have been damaged, and moreover it has proved impossible or at least unsuitable to supplement the feed with high-quality additives. Besides, drying has involved serious environmental problems.

The present invention has for its object to eliminate all these disadvantages. To this end, the invention provides a method which comprises converting the non-mouldable manure into a mouldable product by mixing it with already dried manure, moulding the mouldable product into particles of substantially equal size, and imparting to the particles a fluidising movement by means of a flowing hot gas in a so-called fluidised bed to realize drying of the particles.

The method permits drying of the animal feed without contact with flue gases, which is of great importance since flue gases may provide the feed with non-desirable matters and properties. Besides, drying may be effected by simple means at a well-defined low temperature, resulting in a lenient treatment of the feed constituents, which the flue gases normally do not provide. Said lenient treatment permits using high-quality additives without losses. The additives are preferably admixed simultaneously as the non-mouldable manure is mixed with already dried manure and may thus be supplied in well-determined proportions which are retained in the finished feed by the consistency and shape thereof. It should be mentioned particularly that small amounts of highly active additives may be dosed in liquid form, thereby giving the finished feed a maximum of homogeneity.

From the view-point of environmental protection the present invention implies a great progress, since it may be exploited without disturbance of the environment even when strongly or evil smelling additives are admixed with the manure. Thus, a plant for carrying out the method may be localized without regard to adjacent populated areas.

In exploiting the method the use of fresh manure not more than two days old is recommended. In this way the manure as such yields a high-quality feed.

The invention also relates to a plant for carrying out the method, which comprises a mixer with inlets for both the non-mouldable manure and the already dried manure and possible additives, a unit arranged after the mixer for moulding the particles, and a container having a perforated bottom. The particles are continuously fed into and out of the container and the gas is supplied to the particles in the container substantially upwardly through the perforated bottom thereof at such a speed that a fluidising movement is imparted to the particles in a so-called fluidised bed. The container having the perforated bottom is divided into at least two processing sections following upon each other in the direction of feed of the particles for processing them with separate gases.

The invention will be described in more detail hereinbelow with reference to the accompanying drawing which schematically shows an embodiment, chosen by way of example, of the animal feed making plant.

FIG. 1 shows the entire plant,

FIG. 2 shows, in more detail, an embodiment of the fluidising device of said plant.

The plant shown on the drawing is adapted for drying manure from poultry and other domestic animals, the manure being converted into animal feed, primarily for cattle. The plant is designed so as not to cause any environmental problems due to the evil smelling substances in the manure and possible additives, since the drying is effected in a substantially closed system. The gas for the drying operation, usually air, circulates in the system and will not get into contact with ambient air.

1 designates a supply conduit with a feed screw therein for the semi-fluid non-mouldable manure which has a dry solids content of 15–20%. The conduit 1 opens into the mixer 2 from which the manure is passed to the particle moulding unit 3 which is a pelletising mill in which the particles are given substantially equal size. The particles may be of circular-cylindrical shape about 6 mm in diameter and 10 mm in height. In the unit 3 the mouldable product is pressed into strands which are cut into short pieces for the formation of the particles. The unit 3 opens into the closed fluidising container 4, the outlet 5 of which is provided with a screen. From the outlet 5 there extend at least two conduits 6 and 7 having feed means, the conduit 6 being a conduit for returning dried manure to the mixer 2 and the conduit 7 being a discharge conduit for the finished product. The latter conduit extends via a cooler 8 to a storage silo 9.

The manure dried in the container 4 has a dry solids content of about 85%. So large an amount of dried manure shall be returned to the mixer 2 through the return conduit 6 that the product in the mixer will have a dry solids content of about 50%. With this content the product will permit being moulded or formed into pellets in the unit 3.

The pelletising mill 3 is preferably driven by an electric motor. The current consumption thereof increases considerably with the content of dry solids in the mill, i.e. the current consumption may be considered as a function of the dry solids. It has therefore proved favourable to let the current consumption of the electric motor control the feed of dried manure through the return conduit 6, the feed decreasing with increasing current consumption. In this case it is assumed that the feed of semi-fluid non-mouldable manure is constant. This simple arrangement thus provides a correct mixing ratio of wet to dried manure.

Drying of the product in the fluidising container 4 is operated by means of hot air which is heated as it passes a heating element 10 connected to a furnace 11 or similar heat source. The water vapour from the product condenses on the condenser 12 which is cooled with water from a cooling tower 13. Thus, the air circulates in a substantially closed space having means 10 for heating the air and at least one condenser 12 or other apparatus for discharging the moisture which the air has absorbed from the product. Experience has shown that this closed system eliminates the risk of fire breaking out in the plant, which one has to reckon with in an open system. The advantages of the closed system thus are not restricted only to those gained from the viewpoint of environmental protection.

The fluidising drier is arranged such that the product is given a low moisture content and subjected to a heat treatment resulting in a pasteurisation sufficiently effective to destroy disease germs in the product. This is evident especially from FIG. 2, in which the container 4 is divided into sections 14–18, which constitute drying parts, and section 19 which is adapted merely to hold the product at a constant temperature for a certain period of time to realize pasteurisation. The air flows from the condenser 12 to the heating element of the section 18 and from there upwardly through the container bottom 20. The air then flows alternately through fan, heating element and container through sections 17, 16, 15 and 14, and from there through the condenser 12 back to the fan of section 18 etc. Thus, the air of the drier is conducted in counter-flow to the particles.

The embodiment including the sections 14–18 involve great economical advantages, since the air gradually gets an ever higher moisture content and the air finally passing through the condenser 12 has such a high moisture content that cooling of the air will be cheaper than if the air had passed the fluidising bed only once.

The arrangement of sections 14–18 is advantageous also with respect to dust formation. The risk of dust formation is greatest at the driest part and it is therefore important that the dust is successively carried toward a wetter product to which it should be able to adhere.

The plant according to the invention does not comprise any movable part, such as a conveyor belt, which sometimes is in contact with the entering impure product and sometimes with the finished pure product. The risk of an already pasteurised product being recontaminated is eliminated in that the product is moved in the course of the fluidising operation in the elongated bed from the inlet to the outlet without any mechanical facilities.

To ensure that section 19 really contains a pasteurised product which is not contaminated by gas from other parts of the drier, the space at section 19 is maintained under a slight excess pressure. Thus, no gas from section 18 can penetrate into section 19.

What I claim and desire to secure by Letters Patent is:

1. A method of drying manure from domestic animals to form an edible product, said method comprising:
   (a) forming said manure into particles of substantially equal size, said manure having a solids content of about 50 weight percent expressed on a dry basis;
   (b) passing said particles in a continuous movement from one end to the other of a drying space comprised of multiple stages;
   (c) circulating a flowing, hot gas in a substantially closed space in a direction countercurrent to the movement of said particles in order to dry said particles, said gas being permitted to flow past said particles in an upwardly direction in each of said stages; and
   (d) heating said gas between said multiple stages, said drying of said manure taking place without contact of the manure with flue gases.

2. The method according to claim 1 wherein said particles are fluidized and dried by said flowing, hot gas.

3. The method according to claim 1 wherein said manure is mixed with additives prior to being formed into particles.

4. The method according to claim 1 wherein said gas is caused to circulate in a substantially closed space having means for said heating of said gas and means for removing moisture which said gas has absorbed from said manure.

5. The method according to claim 1 wherein said gas for drying said particles in step (c) carries dust from drier product in the later of said multiple stages to wetter product in the earlier of said stages.

6. The method according to claim 1 wherein dried product is obtained from step (d) and said dried product is heat treated to pasteurize said product.

7. The method according to claim 6 wherein said dried product is pasteurized by means of a separate circulating hot gas having a pressure higher than that of said hot drying gas.

8. A method of drying manure from domestic animals to form an edible product, said method comprising:
   (a) mixing fresh manure with already dried manure to form a manure mixture;
   (b) forming said manure mixture into particles of substantially equal size;
   (c) passing said particles in a continuous movement from one end to the other of a drying space comprised of multiple stages;
   (d) circulating a flowing, hot gas in a substantially closed system in a direction countercurrent to the movement of said particles in order to dry said particles, said gas being permitted to flow past said particles in an upwardly direction in each of said stages; and
   (e) heating said gas between said multiple stages, said drying of said manure taking place without contact of the manure with flue gases.

9. The method according to claim 8 wherein said manure is formed into particles in an apparatus driven by an electric motor, the current consumption of said electric motor, which is a function of the dry solids in said apparatus, being used to control the mixing ratio of fresh manure to dried manure.

* * * * *